United States Patent Office 3,364,165
Patented Jan. 16, 1968

3,364,165
SYNTHETIC LATEX CONTAINING DRY COMPOUNDING SOLIDS AND PROCESS FOR PREPARING SAME
Carl A. Zimmerman, Dover, Del., assignor to International Latex & Chemical Corporation, Dover, Del., a corporation of Delaware
No Drawing. Filed Oct. 16, 1964, Ser. No. 404,491
15 Claims. (Cl. 260—29.7)

This invention relates to improvements in synthetic latices and more particularly it relates to synthetic latices which are capable of having high levels of dry compounding solids incorporated therein.

It has been known for some time that latices of high polymer materials may be produced by the emulsion polymerization technique. The latices so produced are presently in widespread use. Often a butadiene-styrene, or polyvinyl acetate, or acrylate type latex, or alkyd emulsion latex may be used as a base to which dry compounding solids, e.g. fillers, pigments, cements and the like are added. Due to the difficulties encountered in incorporating the dry compounding solids uniformly and/or in great quantities throughout the latex, various dispersants and/or wetting agents are commonly added to the system.

The usual procedure is to combine a surface active agent with a dispersing aid or thickener with the desired dry compounding solids, followed by the addition of water and, if desired, additional dry compounding solids. The mixture is suitably agitated and is then incorporated, with stirring of said mixture, into the latex base. Several important difficulties, however, have been encountered in the compounding of dry solids effected in the manner set forth above.

One such difficulty occurs when incorporating extremely high levels of dry compounding solids into synthetic latices. Thus, in the preparation of plastic building materials, i.e., mortars, grouts, concretes and the like, relatively large amounts of water were heretofore necessary to obtain standard flow and working consistency of said building materials. Since the use of large amounts of water to prepare such building materials adversely affects the strength, flexibility, adhesion and elongation at break, as well as curing volume change, such use constitutes a problem in the state of the art.

In accordance with this invention, it has now been found that latices can be prepared into which dry compounding solids can be directly added thereto without premixing of the solids with an aqueous dispersion. In addition, this invention further overcomes the difficulties enumerated above by providing a latex into which an extremely high level of dry compounding solids may be added while still maintaining a desired fluidity in the compounded latex.

The present invention is based upon discovery that a novel combination of specific monomers, emulsifier, electrolyte and dispersant provides a latex which will facilitate the addition of extremely high levels of dry compounding solids, e.g., whiting, barytes, sand, etc. when mixed directly into the latex. Thus, while the maximum solids content level of most latices heretofore known was in the 70 to 75 percent range, and only a select few have attained a level as high as about 80 to 82 percent, the latex of this invention has been found to yield a fluid compound at a solids level surprisingly as high as about 87 to about 92 percent. (All percentages are based on the weight of the total solids in the latex after compounding.) Broadly, the present invention involves preparing a latex by emulsion polymerization from the following constituents:

(1) Non-carboxylated monomers of unsaturated polymerizable compounds containing a $CH_2$=C< terminal group, i.e., a vinylidene group, (2) An anionic emulsifier, e.g., salt of an alkyl aryloxy polyoxyethylene sulfate, and (3) An electrolyte, i.e., a salt of a bivalent metal, preferably in chelated form and, thereafter, prior to stripping off unreacted monomers and concentrating to the desired solids content, adding:

(4) An anionic dispersant, i.e., a salt of a lower molecular weight polyer (or condensation product) of a complex organic acid, to increase the stability of the latex during stripping.

In accordance with this invention, the latices which may be employed herein comprise copolymers of two or more unsaturated polymerizable non-carboxylated monomers containing a $CH_2$=C< terminal group, i.e., a vinylidene group. Included in this class of monomers are the aliphatic conjugated dienes, such as butadiene-1,3; 2-methyl butadiene-1,3 (isoprene); piperylene; 2,3-dimethyl butadiene-1,3; 2-ethyl butadiene-1,3; other hydrocarbon homologs of butadiene-1,3, and the like; the aryl olefins, such as styrene, vinyl toluene, alpha-methyl styrene, as well as halo-, cyano-, aryl- and other substituted styrenes, and the like; and lower molecular weight nitriles, such as acrylonitrile, methacrylonitrile, ethacrylonitrile, and the like; the lower molecular weight alcohol esters of acrylic and substituted acrylic acids, such as methyl acrylate, ethyl acrylate, methyl methacrylate, and the like; and vinyl compounds, such as vinyl chloride, vinyl acetate, and the like.

Particularly suitable monomeric mixtures include from about 5 to about 90 percent by weight of butadiene-1,3 and from about 10 to about 95 percent by weight of monolefinic monomers, such as styrene, the lower molecular weight alcohol esters of acrylic and substituted acrylic acids and others, as well as mixtures of such monomers. Also included are mixtures of about 50 to about 95 percent by weight of butadiene-1,3 and about 5 to about 50 percent by weight of the low molecular weight nitriles, such as acrylonitrile, methacrylonitrile, and the like, and mixtures thereof.

The present invention is particularly effective when the monomeric material polymerized is a polymerizable aliphatic conjugated diene having from 4 to 6 carbon atoms per molecule with varying amounts of one or more other compounds containing a $CH_2$=C< group which are copolymerizable therewith, such as the aryl olefins. Most preferred are mixtures of about 10 to about 50 percent by weight of butadiene-1,3 and about 50 to about 90 percent by weight of styrene. Although it is readily apparent that there are a multitude of possible reactants, the most readily and commercially available monomers are 1,3-butadiene and styrene. This invention will, therefore, be discussed and exemplified with reference to these typical reactants, remembering that the invention should not be limited to said specific reactants.

The improved latices of this invention can be prepared by different methods of emulsion polymerization. They may be prepared by any of the conventional aqueous emulsion polymerization methods involving various catalyst systems, such as peroxide catalysts, redox systems, and the like. The latex is preferably prepared by a free-radical induced system, such as an aqueous system employing a peroxide or persulfate catalyst. Generally, the amount of peroxide or persulfate catalyst may vary over a wide range, but in most cases a catalyst concentration of from about 0.01 to 3.0 weight percent based on the weight of total monomer charge is satisfactory. In addition when using a redox system, i.e., one that employs an oxidant, such as a peroxide or hydroperoxide as diisopropylbenzene hydroperoxide, benzoylperoxide, tertiary butyl hydroperoxide, methyl cyclohexylhydroperoxide, cumenehydroperoxide, and the like, and an activator, such as compounds of metals such as iron, manganese, copper, vanadium, cobalt, and the like, it is generally assumed that the metal must be a multivalent metal and in such a condition that it can change its valence state reversibly. The amount of peroxide catalyst in this system may range from 0.001 to 2.0 percent by weight of the monomers charged. The amount of activator employed is preferably from about 0.5 to about 1.5 moles per mole of peroxide catalyst employed.

The anionic emulsifier employed in accordance with this invention can be represented by the general formula:

wherein R is an alkyl or an alkyl aryloxy group; the alkyl group or the alkyl portion of the alkyl aryloxy group preferably having from about 8 to about 20 carbon atoms and the aryloxy portion of the latter group preferably being a phenoxy group, $n$ is from 1 to 10, preferably 4½, and X is a monovalent metal or radical, preferably being sodium or ammonium. Non-limiting examples of the anionic emulsifiers which may be employed are the sodium or ammonium salts of an octylphenoxy polyoxyethylene sulfate containing an average of 4½ moles of ethylene oxide, or the sodium or ammonium salts of a nonylphenoxy polyoxyethylene sulfate, containing an average of 4½ moles of ethylene oxide; the nonylphenoxy polyoxyethylene sulfates being the preferred. Among the commercially available products of this nature are: "Stepanol B–129," "Alipal CO–433," "Stepanol B–153," and "Alipal CO–436." The anionic emulsifiers are preferably employed in proportions varying from about 0.5 to about 5.0 parts by weight to a hundred parts of monomers (p.h.m.).

The electrolyte essential to this invention is employed in the proportion of from about 0.1 to about 1.0 part by weight to a hundred parts of monomers (p.h.m.). The electrolyte is a salt of a bivalent metal, preferably a calcium or a magnesium salt. Preferred salts, i.e., those which have been found most satisfactory, are the acetates, chlorides, sulfates, dibasic phosphates, pyrophosphates, and the like. In order to reduce the stability problems which may arise during the polymerization of the latex, it is desirable that the salt be in a chelated form. This can be accomplished by chelating a calcium salt, such as calcium acetate, with an equivalent amount of chelating agent, such as trisodium hydroxyalkyl ethylenediamine triacetate, ethylene diamine tetraacetic acid, its alkali metal salts, and the like. A magnesium salt, chelated in this manner, is also a non-limiting example of one of the salts in chelated form which are suitable for use in this invention.

The anionic dispersants which are employed according to this invention are used in the proportion of about 3 to about 10 parts by weight per hundred parts of the latex solids; with about 5 to about 7 parts per hundred being the preferred range. Such dispersants are necessarily low molecular weight polymers (or condensation products) of complex organic acids, i.e., aryl or alkyl aryl sulfonic acids wherein the alkyl group thereof contains from one to about 10 carbon atoms and the aryl group thereof may be phenyl, naphthyl, or the like. Often formaldehyde is used as a condensating agent. Those compounds, when used in the form of the ammonium or alkali metal salts, are very effective. Among the commercially available products of this nature are: "Tamol N," "Daxad 11," "Darvan 1," "Tamol SN," "Lomar PW," "Tamol 731" and the like; Tamol N being particularly suitable for the purposes of this invention.

The temperature employed in the polymerization reaction depends upon the particular system selected and is, in general, dependent upon the type of catalyst selected. When using the sulfoxylate redox free-radical system, for example, it is generally preferred to operate at relatively low temperatures such as, for example, from about 40° F. to about 80° F.; with particularly good results being obtained at about 40° F. using paramenthane hydroperoxide catalyst.

Peroxides and persulfates may be used at higher temperature without the use of an activator. In general it has been preferred to effect polymerization at a temperature of about 85° F. to about 150° F. Thus, particularly suitable polymerization results may be obtained with potassium persulfate at temperatures of about 120°–150° F.

The synthetic latices prepared in accordance with this invention may be described as stable dispersions of solid or semi-solid non-carboxylated copolymers in an aqueous medium. The solids content of the latex may vary from about 20 percent by weight to about 70 percent by weight of the total weight of the latex. Generally, the aqueous copolymer dispersions directly produced by the emulsion polymerization are treated with the anionic dispersant, stripped of unreacted monomers and concentrated to a desired solids content of from about 40 percent to about 60 percent by weight of the total weight of the resulting latex. Preferably, the synthetic latices of this invention have a solids content of from about 48 percent to about 50 percent by weight of the total weight of the latex.

As heretofore mentioned, the improved latices, according to this invention, suitably find utility in the preparation of grout coats, fillers, or high solids paints for porous and semi-porous surfaces, i.e., stucco, cinder block, plaster, cement block, wood, fiberboard, concrete, and the like. In addition, the latices may be used to provide cement mixes, i.e., cement mortar, cement grouts, concrete, and the like, suitable for flowing into molds or pre-assembled forms to produce, after setting, structure, members, objects or the like which are made from conventional cement mixes. Furthermore, it will be appreciated that the high solids latex compositions of this invention may be employed as coatings for textiles, papers, paperboard, woven and non-woven fabrics, and the like; particularly where rapid drying of the coating is desired.

Such high solids, fluid latex mixtures may be made by adding dry powdered whiting, barytes, cement, etc., to the latex with mixing and such added water as necessary for incorporating of other desirable additives to the mixture. Often it may be desirable to incorporate additional anionic and nonionic stabilizers into the mixture to provide chemical stability to certain solid materials incorporated therein. For example use of Stepanol B–129, and/or Igepal CO–880 (nonylphenoxy poly(ethylenoxy) ethanol) is desired when Portland Cement is incorporated within a latex mixture. Advantageously, small amounts of the anionic dispersants are often added to the fluid mixture to further improve its stability. It will be appreciated that all of the anionic dispersants may be added prior to stripping the unreacted monomers from the latex as heretofore mentioned, or a portion of the desired total may be added during compounding. In any event, the total amount of dispersant in the compounded latex will be within the necessary range of from about 3 to about 10 parts per hundred parts of the latex solids. The resulting high solids latex mixture, as heretofore described, can advantageously have a total solids content (that is, the amount of solid copolymer plus the amount of compounding dry solids) of as high as about 87 to about 92 percent by weight of the compounded latex mixture while still having the desired level of fluidity. That is, in accordance with this invention, the high solids latex mixtures described above are readily pourable liquids having relatively low viscosities, i.e., well below 100,000 centipoises. In contrast, other dry compounded solids-latex mixtures of comparative total solids content are pasty semi-solids, being non-pourable, and having high viscosities, i.e., above about 100,000 centipoises.

Thus, in a like manner most of the common paint pigments may be mixed with the latices of this invention to produce a high solids paint or coating composition of the water dispersion type, which dries to form an opaque film. The pigments may be added as dry powders to the latex, i.e., compounded with the latex, without the problem of coagulation of the latex as heretofore encountered. Typical paint pigments which may be successfully incorporated with the latex of this invention into a paint include titanium dioxide (the anatase or rutile grade is satisfactory), clay, silica, lithopone, mica, marytes (barium sulfate), talc, and zinc sulfide. Many dyes and colored pigments may be included in the pigment formulation, including carbon black, iron oxides, cadmium yellows, phthalocyanines, ultramarine, chromium oxides, umber and sienna. The high dry compounding solids acceptability of the latices of this invention also advantageously may provide a solution to the adhesion problem often encountered when applying latex-type paints to chalky exterior surfaces.

Additionally, latices of this invention also find utility in use as a low-cost coating for paper and related materials, as a primer or base coat, a seal pre-coat for tarry residues, or for carpet backing application.

Advantages for this invention are illustrated by the following examples. The monomers, and the other specific ingredients of the recipes are presented as being typical and various modifications can be made in view of the foregoing disclosure and discussion, without departing from the spirit or scope of the disclosure or of the claims.

*Example I*

This example illustrates a typical recipe and method for preparing the latices of this invention by emulsion polymerization.

| Components: | Parts by wt. |
|---|---|
| Butadiene | 33 |
| Styrene | 67 |
| Distilled water | 130 |
| Stepanol B-129 (1) | 3.0 |
| Sequestrene AA (2) | 0.05 |
| Chelated calcium salt (3) | 0.2 |
| Potassium persulfate | 0.2 |

¹ Sodium salt of nonylphenoxy polyoxyethylene sulfate containing an average of 4½ moles of ethylene oxide.
² Ethylene diamine tetraacetic acid used to chelate any unwanted residual metallic impurities in the recipe.
³ Calcium acetate chelated with PK-80 (trisodium hydroxy alkyl ethylene diamine triacetate).

All of the above components were loaded in a 28 oz. bottle with a conventional crimp type metal cap. The bottle was placed in a temperature controlled water bath and rotated end over end to insure constant mixing of its contents. Initially the temperature of the bath was 50° C. After two hours, the temperature of the bath was raised to 55° C. At 50–60 percent conversion, its temperature was raised to 65° C.

After the desired degree of polymerization had been reached, 1.0 part of Tamol N per hundred parts of latex solids was added in a 12½ percent aqueous solution and the pH adjusted to 8.5–9.0. The latex was then stripped of unreacted monomers and concentrated to a solids content of 48–50 percent of the total weight of the latex.

*Example II*

This example illustrates the fluidity obtained in grout coats having extremely high solids content when prepared with the improved latices of this invention. The grout coats were made by mixing dry powdered whiting and/or barytes into the latex described in Example I together with necessary amounts of the anionic dispersant and other desirable additives.

TABLE 2.—GROUT COAT LATEX COMPOSITIONS

| | Parts by Weight | | | | |
|---|---|---|---|---|---|
| | A | B | C | D | E |
| Latex (48% solids) | 208.0 | 208.0 | 208.0 | 208.0 | 208.0 |
| Santowhite Powder ¹ (50% aqueous solution) | 0.5 | 0.5 | 0.5 | 0.5 | 0.5 |
| Tamol N ² (25% aqueous solution) | 28.0 | 28.0 | 28.0 | 28.0 | 28.0 |
| Nopco NDW ³ | 2.0 | 2.0 | 2.0 | 2.0 | 2.0 |
| #3 Whiting ⁴ (dry powdered natural calcium carbonate) | 800.0 | 600 | 400 | 300 | |
| #22 Barytes ⁴ (barium sulfate) | | 200 | 400 | 700 | 1,400 |
| Total solids (percent by weight of the total composition) | 87.55 | 87.55 | 87.55 | 89.56 | 91.61 |
| Viscosity, centipoises ⁵ | 16,000 | 4,500 | 2,500 | 3,500 | 27,000 |

¹ 4,4-butylidiene-bis (6-tert-butyl-meta-cresol).
² Sodium salt of a condensed polyarylsulfonic acid.
³ A defoamer sold by Nopco Chemical Co.
⁴ #3 Whiting and #22 Barytes supplied by Thompson-Weinman & Co., Inc.
⁵ Viscosity measured by Brookfield viscosimeter with a #6 spindle at 20 r.p.m.

Inspection of the above data illustrates that pourable low viscosity liquid compositions can be obtained by compounding large amounts of solids into the latices of this invention.

Although the present invention is described with particular reference to a specific embodiment, it will be appreciated that various changes and modifications can be made therein without departing from the spirit of the invention.

What is claimed is:

1. An improved latex for incorporating high levels of dry compounding solids therein which comprises an aqueous dispersion of copolymers of an aliphatic conjugated diene having from 4 to 6 carbon atoms per molecule and at least one other polymerizable non-carboxylated monomer containing an active $CH_2=C<$ group polymerized in an aqueous medium containing from about 0.5 to about 5.0 parts by weight (p.h.m.) of an anionic emulsifier having the general formula:

$$R(OCH_2CH_2)_nOSO_3X$$

wherein R is a hydrocarbon radical selected from the group consisting of alkyl and alkylaryloxy groups, $n$ is an integer from 1 to 10, and X is a radical selected from the group consisting of alkali metals and ammonium; and from about 0.1 to about 1.0 part by weight (p.h.m.) of a chelated salt of a bivalent metal selected from the group consisting of calcium and magnesium; said latex containing from about 3 to about 10 parts by weight per hundred parts of latex solids of at least one anionic dispersant added after polymerization, said dispersant comprising a salt of a low molecular weight polymer of complex organic acids selected from the group consisting of aryl and alkyl aryl sulfonic acids.

2. The latex of claim 1 in which the copolymer comprises from about 50 to about 90 percent by weight of butadiene-1,3 and about 5 to about 50 percent by weight of acrylonitrile.

3. The latex of claim 1 in which the copolymer comprises from about 5 to about 90 percent by weight of butadiene 1,3 and about 10 to about 95 percent by weight of styrene.

4. The latex of claim 1 in which said salt comprises a salt selected from the group consisting of calcium and magnesium acetate chelated with trisodium hydroxyalkyl ethylenediamine triacetate.

5. The latex of claim 1 in which the anionic dispersant is selected from the group consisting of the ammonium and alkali metal salts.

6. The latex of claim 5 in which the anionic dispersant is a sodium salt of a condensed polyarylsulfonic acid.

7. An improved latex for incorporating high levels of dry compounding solids therein which comprises an aqueous dispersion of a butadiene-styrene copolymer polymerized in an aqueous emulsion containing from about 0.5 to about 5.0 parts by weight (p.h.m.) of a sodium salt of nonylphenoxy polyethylene sulfate containing an average of 4½ moles of ethylene oxide and from about 0.1 to about 1.0 part by weight (p.h.m.) of calcium acetate chelated with trisodium hydroxyalkyl ethylenediamine triacetate; said latex also containing from about 3 to about 10 parts by weight per hundred parts of latex solids of a sodium salt of a condensed polyarylsulfonic acid added after polymerization.

8. A pourable compounded latex composition containing up to about 92 percent by weight solids which comprises an admixture of finely divided dry compounding solids and an aqueous dispersion of copolymers of an aliphatic conjugated diene having from 4 to 6 carbon atoms per molecule and at least one polymerizable non-carboxylated monomer containing an active $CH_2{=}C{<}$ group polymerized in an aqueous emulsion containing from about 0.5 to about 5.0 parts by weight (p.h.m.) of an anionic emulsifier having the general formula:

$$R(OCH_2CH_2)_nOSO_3X$$

wherein R is a hydrocarbon radical selected from the group consisting of alkyl and alkylaryloxy groups, $n$ is an integer from 1 to 10, and X is a radical selected from the group consisting of alkali metals and ammonium; and from about 0.1 to about 1.0 part by weight (p.h.m.) of an electrolyte comprising a chelated salt of a bivalent metal selected from the group consisting of calcium and magnesium; said dispersion also containing from about 3 to about 10 parts by weight per hundred parts of latex solids of at least one anionic dispersant added after polymerization, said dispersant comprising a salt of lower molecular weight polymers of complex organic acids selected from the group consisting of aryl and alkyl aryl sulfonic acids.

9. The composition of claim 8 in which said dry compounding solids include whiting, other paint pigments, cement, sand, other concrete aggregates and the like.

10. A process for producing an improved latex capable of incorporating high levels of dry compounding solids therein which comprises polymerizing an aliphatic conjugated diene having 4 to 6 carbon atoms per molecule and at least one other polymerizable non-carboxylated monomer containing an active $CH_2{=}C{<}$ group in an aqueous emulsion to form copolymers thereof, said emulsion containing from about 0.5 to 5.0 parts by weight (p.h.m.) of an anionic emulsifier having the general formula:

$$R(OCH_2CH_2)_nOSO_3X$$

wherein R is a hydrocarbon radical selected from the group consisting of alkyl and alkylaryloxy groups, $n$ is an integer from 1 to 10, and X is a radical selected from the group consisting of alkali metals and ammonium; and from about 0.1 to 1.0 part by weight (p.h.m.) of a chelated salt of a bivalent metal selected from the group consisting of calcium and magnesium, adding to said emulsion after polymerization from about 3 to about 10 parts by weight per hundred parts of latex solids of an anionic dispersant comprising a salt of low molecular weight polymers of complex organic acids selected from the group consisting of aryl and alkyl aryl sulfonic acids.

11. The process of claim 10 in which said copolymer emulsion is concentrated to a desired level of latex solids after stripping of said unreacted monomers therefrom.

12. The process of claim 10 in which the copolymer comprises from about 50 to about 90 percent by weight of butadiene-1,3 and about 5 to about 50 percent by weight of acrylonitrile.

13. The process of claim 10 in which the copolymer comprises from about 5 to about 90 percent by weight of butadiene-1,3 and about 10 to about 95 percent by weight of styrene.

14. The process of claim 10 in which the copolymer comprises about 33 percent by weight of butadiene-1,3 and about 67 percent by weight of styrene.

15. A process for producing pourable compounded latex compositions containing up to about 92 percent by weight solids which comprises adding finely divided dry compounding solids and from about 3 to about 10 parts by weight per hundred parts of latex solids of an anionic dispersant comprising a salt of a low molecular weight polymer of complex organic acids selected from the group consisting of aryl and alkyl aryl sulfonic acids to a latex comprising an aqueous dispersion of non-carboxylated copolymers formed from an aliphatic conjugated diene having from 4 to 6 carbon atoms per molecule and at least one different unsaturated polymerizable monomer containing a $CH_2{=}C{<}$ group polymerized in an aqueous emulsion containing from about 0.5 to about 5.0 parts by weight (p.h.m.) of an anionic emulsifier having the general formula:

$$R(OCH_2CH_2)_nOSO_3X$$

wherein R is a hydrocarbon radical selected from the group consisting of alkyl and alkylaryloxy groups, $n$ is an integer from 1 to 10, and X is a radical selected from the group consisting of alkali metals and ammonium; and from about 0.1 to 1.0 part by weight (p.h.m.) of an electrolyte comprising a chelated salt of a bivalent metal selected from the group consisting of calcium and magnesium; and thereafter intimately admixing said solids and dispersant into said latex.

References Cited

UNITED STATES PATENTS

| | | | |
|---|---|---|---|
| 2,538,779 | 1/1951 | Harrison et al. | 260—29.7 |
| 2,605,242 | 7/1952 | Betts et al. | 260—8 |
| 2,676,930 | 4/1954 | McKay et al. | 260—8 |
| 2,936,295 | 5/1960 | Brodkey et al. | 260—29.7 |
| 3,015,642 | 1/1962 | Bawn et al. | 260—29.7 |
| 3,043,790 | 7/1962 | Sanders | 260—29.7 |
| 3,222,311 | 12/1965 | Miller et al. | 260—29.7 |
| 3,236,800 | 2/1966 | Waterman et al. | 260—29.7 |
| 3,256,232 | 6/1966 | Tullsen et al. | 260—29.6 |

MURRAY TILLMAN, *Primary Examiner.*

J. T. GOOLKASIAN, J. ZIEGLER, *Assistant Examiners.*

UNITED STATES PATENT OFFICE
CERTIFICATE OF CORRECTION

Patent No. 3,364,165　　　　　　　　　　　　　January 16, 1968

Carl A. Zimmerman

It is hereby certified that error appears in the above numbered patent requiring correction and that the said Letters Patent should read as corrected below.

Column 2, line 13, for "polyer" read -- polymer --; line 31, after "methyl methacrylate" insert -- butyl methacrylate --; column 5, line 15, for "marytes" read -- barytes --.

Signed and sealed this 1st day of April 1969.

(SEAL)
Attest:

Edward M. Fletcher, Jr.　　　　　　　　　　　EDWARD J. BRENNER
Attesting Officer　　　　　　　　　　　　　　Commissioner of Patents